United States Patent [19]

Nanci et al.

[11] Patent Number: 4,460,009

[45] Date of Patent: Jul. 17, 1984

[54] VALVE STEM ACTUATOR

[75] Inventors: James R. Nanci, Pittsburgh; James MacGregor, Claysville, both of Pa.

[73] Assignee: Ralph A. Hiller Company, Pittsburgh, Pa.

[21] Appl. No.: 415,676

[22] Filed: Sep. 7, 1982

[51] Int. Cl.³ .................... F16K 31/122; F16K 31/54
[52] U.S. Cl. .................... 137/243.6; 74/661; 74/832; 51/241 VS; 137/331; 251/58; 251/229; 251/249.5
[58] Field of Search ............. 137/330, 331, 333, 243, 137/243.6, 243.7; 74/89.15, 25, 33, 424.8 R, 424.8 VA, 661, 832; 251/249.5, 58, 229, 267; 51/27, 29, 30, 241 VS

[56] References Cited

U.S. PATENT DOCUMENTS

| | | | |
|---|---|---|---|
| 2,238,814 | 4/1941 | Kneass, Jr. | 137/243.6 |
| 2,996,075 | 8/1961 | Deimer et al. | 137/243 |
| 3,311,121 | 3/1967 | Morrell | 137/243.6 |
| 3,505,888 | 4/1970 | Denkowski | 74/89.15 |
| 4,338,961 | 7/1982 | Karpenko | 137/331 |
| 4,346,728 | 8/1982 | Sulzer | 137/331 |

Primary Examiner—George L. Walton
Attorney, Agent, or Firm—Reed, Smith, Shaw & McClay

[57] ABSTRACT

A valve stem actuator for a slurry valve or the like includes a support frame extending from the valve body to a linear operator having a cylinder and piston. Means are provided for connecting the piston rod to the valve stem and means reciprocally mounted on the support frame rotate the valve stem with respect to the valve body independently of the linear movement of the valve stem to dislodge accumulated crust to permit the valve disc to properly seat to prevent fluid flow through the valve. The linear operator is preferably pneumatically or hydraulically actuated and the rotary actuator preferably comprises an air or hydraulically actuated rack engageable with the valve stem. The valve stem actuator is useful for new valves or for retrofit of present slurry valves or the like.

18 Claims, 6 Drawing Figures

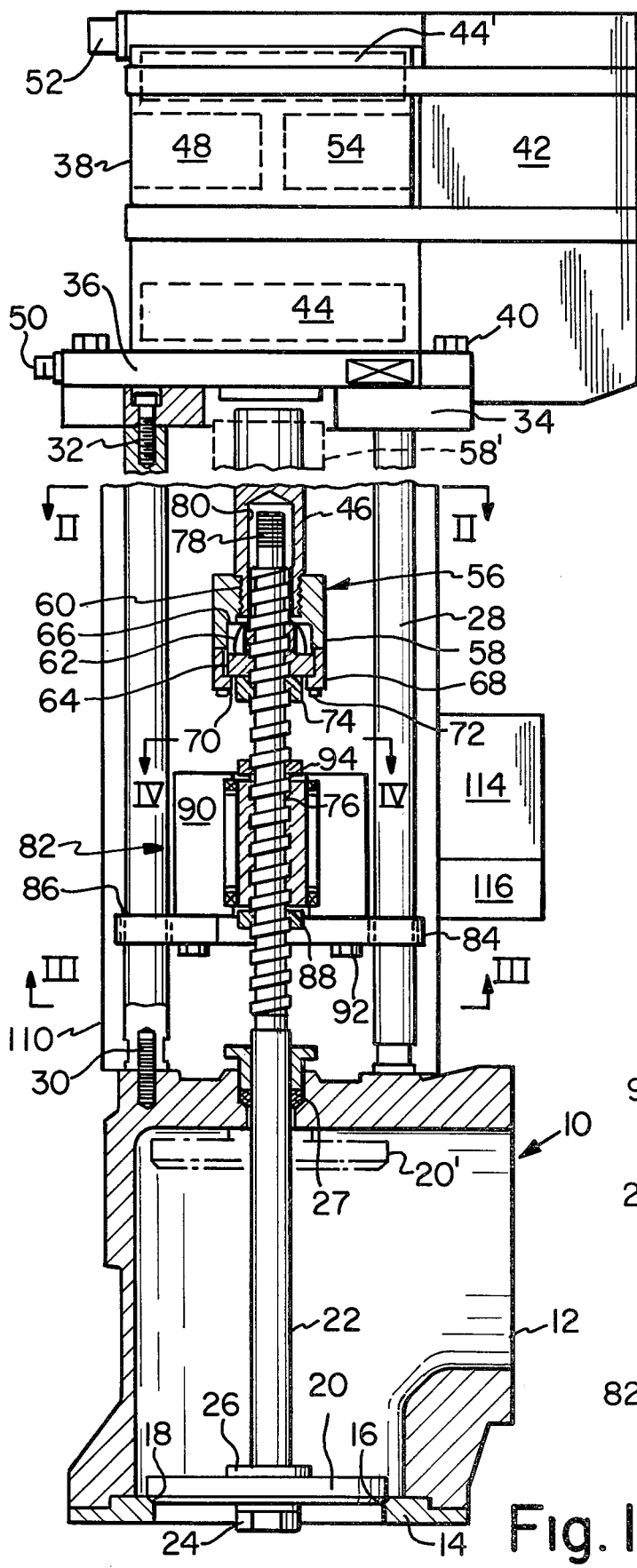
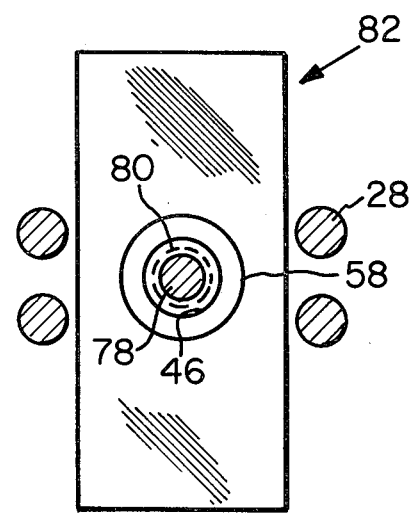
Fig. 2
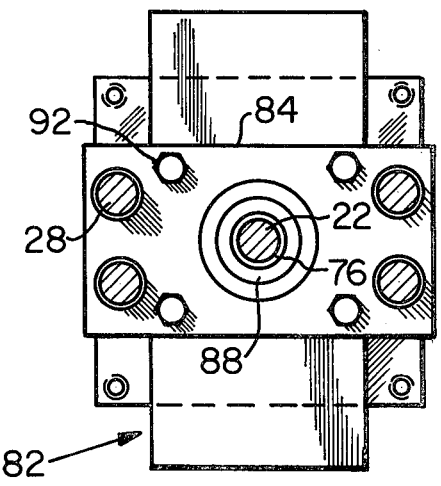
Fig. 3
Fig. 1

VALVE STEM ACTUATOR

BACKGROUND OF THE INVENTION

1. Field of the Invention

This invention relates to a valve stem actuator and particularly to an actuator for independently moving a valve stem linearly and rotatably to effect a liquid seal between the valve disc and the valve seat. The preferred application of the invention is in connection with a slurry valve or the like wherein the valve seat is subject to encrustation of materials, such as alumina scale or the like which inhibits proper seating of the valve disc on the seat. The invention is useful in new valves or as a retrofit in present valve assemblies.

2. Description of the Prior Art

Slurry valves are subject to severe encrustation or unavoidable build-up of undesired materials in and about the valve seal. Over time, the build-up tends to prevent proper seating of the valve disc on the seat, thus permitting unwanted liquid flow through the valve even when the valve is intended to be closed. In existing slurry valves having a valve yoke and stem design, the stem is manually screwed down using spaced T-handles. The upper handle initially tightens down the valve disc against the seat and the lower handle is then rapped sharply, for instance with a sledge hammer or the like, to rotate the disc and grind off the encrusted material to permit seating of the valve.

It is apparent that a better solution to the problem of encrustation is needed. The present solution requires considerable manual labor and consequent expense. The results of this hit-or-miss solution are also unpredictable. In some cases, the crust will break away when rapped making it more difficult to seat the valve to shut off the flow of liquid.

Possible reasons do exist why the problem remains. Some have believed that it is too costly to equip new valves with actuating means for breaking up encrustation of materials on the valve seat. Others believe it is too expensive to retrofit existing manual valves in the field with actuators having means for breaking up the encrustation build-up. We have overcome both of these apparent obstacles with this invention.

SUMMARY OF THE INVENTION

We have invented a valve stem actuator for a slurry valve and the like in which the valve stem is independently moveable both linearly and rotatably. Rotation is accomplished with all or a portion of the thrust of the linear actuator applied to the valve disc.

Briefly, our valve actuator comprises a support frame including a plurality of spaced posts adapted to extend from the valve body to a linear operator having a cylinder and piston. Means are provided for connecting the piston rod to the valve stem. Preferably, such means comprise a sleeve having a bore, one end of the bore being internally threaded for engagement with external threads on the end of the piston rod and a bearing, which is press fit on a bushing extending into the opposite end of the bore. The bushing is internally threaded, preferably with an Acme thread, to cooperate with a known valve stem which also has an external Acme thread. A cylindrical cap is secured to the sleeve to retain the bushing and bearing in position with respect to the sleeve. The cap contacts the bottom surface of the bushing for raising the valve stem. Alternatively, where the valve stem is not threaded, a wedge-type coupling, for example, can be used to connect the valve stem to the piston rod. Such wedge-type couplings are known as, for example, the "Posit-Grip" bushings sold by Roller Bearing Company of America.

In either case, means are also provided for rotating the valve stem independently of the piston rod. In a preferred embodiment, a transverse plate member having openings aligned with the posts is slidably mounted on the posts. A rotary actuator is mounted on the plate member. The valve stem includes a section, which may be threaded in whole or in part, which is engageable with a corresponding threaded or smooth-bored pinion, respectively, in the actuator which is driven by a rack on the actuator to provide rotation to the stem. The smooth-bored pinion may be engaged to the stem by a wedge-type coupling. After the valve disc is engaged against an encrusted seat under force of the linear actuator, upon movement of the rack it is rotated independently of the linear actuator to grind accumulated crust to permit the valve disc to properly seat to prevent fluid flow through the valve.

With the use of our valve stem actuator, encrustation or build-up on the valve seat is ground concentrically, resulting effectively in a new valve seat.

The actuator may be embodied on new slurry valves or employed as a retrofit for existing slurry valves without substantial capital costs.

The invention will become evident and will be fully appreciated by those skilled in the art from the following description when taken with the accompanying drawings.

BRIEF DESCRIPTION OF THE DRAWINGS

FIG. 1 is an elevation view of our valve stem actuator with various portions shown in cut-away section for clarity;

FIG. 2 is a section taken along lines II—II of FIG. 1;

FIG. 3 is a section taken along lines III—III of FIG. 1;

DETAILED DESCRIPTION OF A PREFERRED EMBODIMENT OF THE INVENTION

Figure 4:
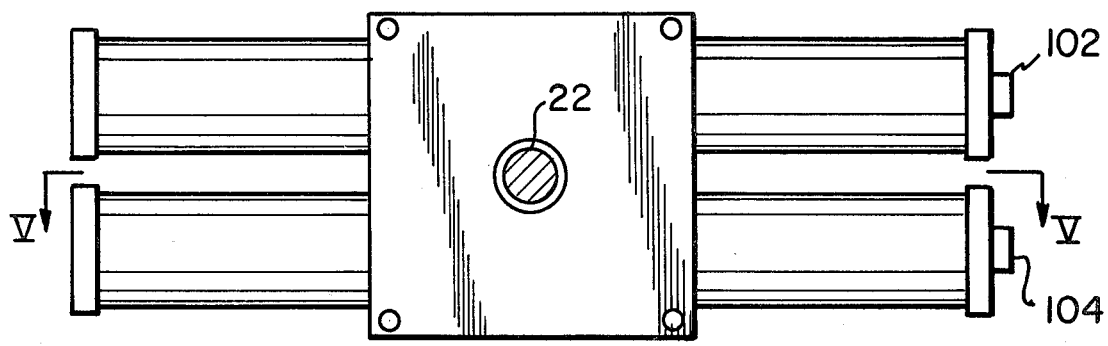
FIG. 4 is a top plan view of a rotary actuator useful in the invention.

Referring to the drawings, a conventional slurry valve 10 includes a valve body 12 having a valve plate 14 defining a port 16 including a valve seat 18. A valve disc 20 is connected to a threaded portion at the valve end of stem 22 by a nut 24. A spacer washer 26 is provided between the upper surface of the valve disc and a shoulder of the stem. The stem extends through a bushed packing 27 in the valve body 12.

A valve yoke includes four yoke legs 28 attached at one end to the valve body 12 by a fastener 30 and at the opposite end by a fastener 32 through mounting plate 34. One head 36 of a cylinder 38 for operating the valve stem linearly is attached to mounting plate 34 by fasteners 40. Air is supplied to the cylinder 38 from an air tank 42 connected on opposite sides of a piston 44 that has a rod 46 which is connected to the valve stem 22. Low inlet operating pressures can be used with the addition of an air intensifier 48, which may be an air driven pump to increase air pressure from say 60 to 400 psi as required. Ports 50 and 52 are included to control the linear travel of the piston 44 through a four-way valve and, thus, the valve stem 22. Hydraulic or electric operators may be used in place of the pneumatic operator. With the valve in the closed position, air pressure will be maintained on the piston side of the cylinder to keep the valve closed. The actuator can be opened, when desired, by means of manual or automatic override controls 54.

The connection between the piston rod 46 and the valve stem 22 is effected by the assembly indicated generally by the numeral 56. In a preferred embodiment, the connection assembly comprises a sleeve 58. Internal threads in one end of bore 60 of the sleeve engage external threads on the end of the piston rod 46. A bearing 62 is press fit onto an end of an internally threaded bushing 64 and disposed in the opposite end of the bore 60 against a shoulder 66 of the sleeve. A cylindrical cap 68 having an inwardly extending annulus 70 is connected to the sleeve by fasteners 72 to contact the lower surface of the threaded bushing 64 to permit the stem to be raised. The location of the connection on the valve stem is maintained by the internally threaded bushing 64 and internally threaded nut 74 which engage threads 76 on the perimeter of the valve stem 22.

In the preferred embodiment, the bearing 62 is a cone-type bearing. For high pressures a thrust bearing can be used.

As shown in FIG. 1, the end of the valve stem 22, which may be a known stem for a manual valve, includes a reduced threaded section 78 and is disposed in a cylindrical bore 80 formed in the end of the piston rod 46. Sufficient clearance is provided between the end of the valve stem 22 and the closed end of the bore 80 in such a retrofit to prevent contact between them which could result in attempted rotation of the piston rod and cylinder 38. Where the valve stem is designed for use with our actuator the reduced threaded section 78 can be eliminated and the depth of bore 80 reduced accordingly. In addition, where either the valve stem or the piston rod (or both) is not threaded, a wedge-type coupling may be used to connect the two.

Figure 5:
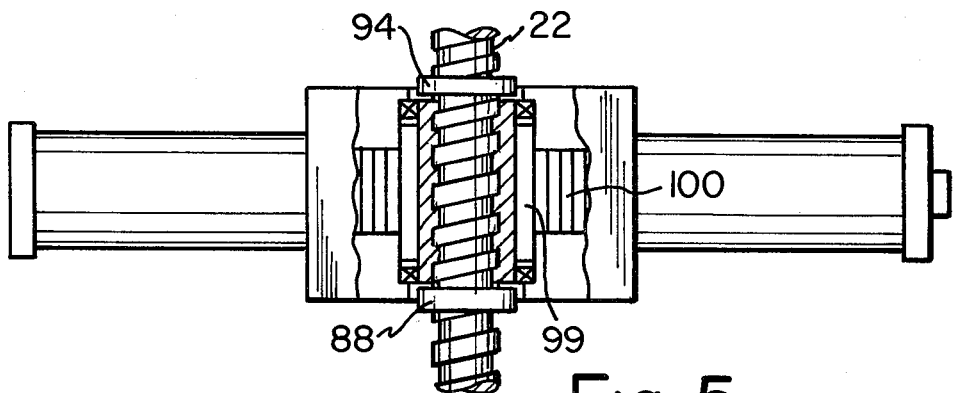
FIG. 5 is a section taken along lines V—V through the actuator of FIG. 4.

Between assembly 56 of the valve stem 22 to the piston rod 46 and valve body 12 is a rotary operator, indicated generally at 82, for rotating the valve stem 22 independently of the piston rod 46 of the linear operator. The operator 82 includes a substantially rectangular plate 84 having four openings 86 through which the four legs 28 pass. A locking nut 88 having internal threads engageable with the external threads 76 prevents the plate 84 and the actuator from rising with respect to the stem 22. A modified rotary actuator 90, such as hydraulic actuators similar to those available from Flo-Tork, Inc. of Orrville, Ohio and shown and described in the catalog of that company, No. RA 500 (R580), copyright 1979, is located on the plate 84 and held by four fasteners 92. A second locking nut 94, similar to nut 88, locks the rotary actuator on the stem 22 to prevent it from rising as stem 22 is rotated. The valve stem 22 may be entirely threaded in the location of the rotary actuator and in such case pinion 98 has internal threads which engage the threads of stem 22 and external teeth 99 which are driven by a rack 100 in the actuator (See FIG. 5) in much the same manner as the output shaft of known rotary actuators such as those available from Flo-Tork. Hydraulic fluid is selectively provided and controlled to either side of the rack through ports 102, 104 as required, to move the rack to provide rotation to the valve stem 22 (See FIG. 4).

Figure 6:
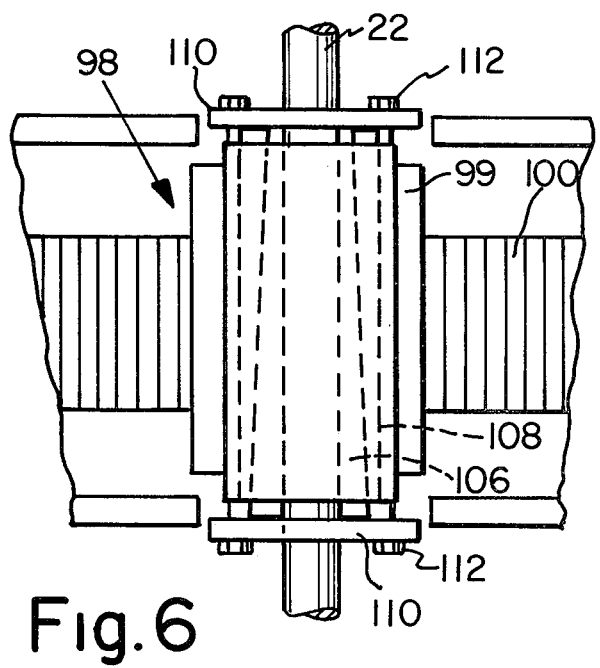
FIG. 6 is a section similar to FIG. 5 showing the actuator with a wedge-type coupling on a smooth valve stem.

Alternatively as shown in FIG. 6, in the case of new, as distinguished from retrofit installations, it is unnecessary for the valve stem 22 to be threaded in the area of the rotary actuator. In this embodiment, the pinion 98 comprises a smooth bore cylinder having teeth 99 for engagement with a rack 100 like that illustrated in FIG. 5. Opposed wedge-shaped cones 106, 108 of the type used in the "Posit-Grip" bushings are disposed between the smooth valve stem 22 and the smooth bore of the pinion are secured by torquing circular locking plates 110 against opposite ends of the wedges with fasteners 112 which are provided around the perimeter of each plate.

In some installations, approximately 1500–2000 psi is required to rotate the valve stem and valve disc under pressure. In this case an air-oil intensifier 114 having its own reservoir (not shown) forming a closed loop system is also provided for the actuator. Such an actuator can raise the pressure from 60 psi to 1500–2000 psi, as required. In a preferred embodiment, the air-oil intensifier will automatically shut off when the rotary actuator has rotated 90°. If flow has not stopped at this point, rotation may be reversed by shifting the control valve 116 manually or automatically. This procedure can be continued until a good valve seat has been formed and all flow is stopped.

The preferred rotary actuator can be replaced by a gear motor, which may be hydraulically or electrically driven, if desired.

To protect a human operator, a splash guard 118 may be used (See FIGS. 1 and 2).

The valve disc may be moved through its full stroke by means of piston 44 (the alternate maximum travel of position of piston 44', sleeve 58' and disc 20' being shown in dot-dash lines in FIG. 1) to open the valve as in the same manner as conventional slurry valves.

Through the use of our invention, it is possible to close the valve disc 20 on the valve seat 18 using the linear operator. If it is noted that continued flow passes through the valve, the valve stem 22 and valve disc 20 can, independently of any linear movement, be reciprocally rotated through 90° under full or partial pressure to grind the encrusted build-up of materials around the seat opening to form a new seat in the built-up materials to obtain proper seating of the valve disc 20 to shut off the flow. Once the liquid flow has stopped, as indicated by position or flow indication or by visual inspection, rotation of the valve disc and stem is no longer required. The valve stem can, through its connection with the piston rod 46 of the linear operator via assembly 56, be designed to separately rotate through 90°, 180°, 360° or even greater. The valve actuator is also designed such that 100 percent of the torque produced by the rotary actuator 90 is directed to the valve stem for better grinding of encrusted materials on the valve seat 18. The reaction of the rotary actuator is divided and absorbed by the four yoke legs 28.

The valve stem actuator is particularly useful for cleaning slurry valve build-up, but can be used in other valve types. In addition, the actuator according to the invention is applicable to new valves and to field retrofit present valves.

Having described a presently preferred embodiment of our invention, it is to be understood that it may otherwise be embodied within the scope of the appended claims.

We claim:

1. A valve stem actuator for a slurry valve or the like wherein the valve seat of the valve body is subject to encrustation of materials which inhibits proper seating of the valve disc on the valve seat and wherein the valve includes a longitudinally extending valve stem adapted for connection on the end opposite the valve disc, said actuator comprising:

(a) a support frame adapted to extend from said body;
(b) an operator mounted on said support frame including a cylinder having a piston with a piston rod for moving said valve stem linearly with respect to said body;
(c) means for connecting the piston rod to the valve stem;
(d) means mounted and linearly received on said support frame during the linear movement of said valve stem, for rotating said valve stem about its axis in either direction with respect to said valve body independently of said linear movement of said valve stem to dislodge accumulated crust to permit the valve disc to properly seat to prevent fluid flow through the valve.

2. A valve stem actuator as set forth in claim 1 wherein the support frame comprises a plurality of posts extending from said valve body and said operator is mounted thereto.

3. A valve stem actuator as set forth in claim 2 wherein said means for rotating said valve is mounted on said posts.

4. A valve stem actuator as set forth in claim 1, claim 2 or claim 3 wherein the end of said piston rod is externally threaded and the connection means comprises a sleeve having a bore, one end of said bore being internally threaded for engagement with the external threads of said piston rod, a bushing in the opposite end of the bore and having internal threads for engagement with said stem, a bearing on said bushing and a cap secured to the sleeve for retaining the bushing and bearing in position to permit linear movement of the valve stem by the operator.

5. A valve stem as set forth in claim 4 wherein said valve stem rotating means comprises a transverse plate member mounted on said frame and a rotary actuator mounted on said member, the rotary actuator including a pinion engageable with said stem, a rack engageable with said pinion, and means for driving the rack with respect to the pinion to rotate the stem when the valve disc is engaged against an encrusted valve seat under force of the linear operator independently of linear movement to dislodge or grind accumulated material to permit the valve disc to properly seat to prevent fluid flow through the valve.

6. The improvement as set forth in claim 4 wherein the piston rod is internally bored to receive the end of the stem, the depth of the bore being sufficient to provide a space between the terminus of the stem and the bottom of the bore.

7. A valve stem as set forth in claim 5 wherein said pinion includes an internally threaded bore for engagement with said stem and the external surface of said pinion includes teeth for engagement with a gear rack for driving the pinion with respect to the rack.

8. A valve stem as set forth in claim 5 wherein said pinion includes a smooth bore, the external surface of the pinion includes teeth for engagement with a gear rack for driving the pinion with respect to the rack, and wedges are disposed between the pinion and the stem for engaging the stem and the pinion.

9. A valve stem actuator as set forth in claim 1, claim 2 or claim 3 wherein the connection means comprises a wedge-type coupling.

10. A valve stem actuator as set forth in claim 1 wherein the support frame comprises four spaced posts and the rotating means for said valve stem includes a plate member having openings aligned with said posts which permit said member to reciprocate with respect to said posts.

11. A valve stem actuator for a slurry valve or the like wherein the valve seat of the valve body is subject to encrustation of materials which inhibits proper seating of the valve disc on the valve seat and wherein the valve includes a longitudinally extending valve stem adapted for connection on the end opposite the valve disc, said actuator comprising:

(a) a plurality of posts extending from said valve body;
(b) an operator mounted on said posts including a cylinder having a piston with a piston rod, wherein the end of said piston rod is externally threaded, for moving said valve stem linearly with respect to said body;
(c) means for connecting the piston rod to the valve stem, wherein the connection means comprises a sleeve having a bore, one end of said bore being internally threaded for engagement with the external threads of said piston rod, a bushing in the opposite end of the bore and having internal threads for engagement with said stem, a bearing on said bushing and a cap secured to the sleeve for retaining the bushing and bearing in position to permit linear movement of the valve stem by the operator;
(d) means mounted and linearly received on said posts during the linear movement of said valve stem for rotating said valve stem about its axis in either direction with respect to said valve body independently of said linear movement of said valve stem to dislodge accumulated crust to permit the valve disc to properly seat to prevent fluid flow through the valve.

12. A valve stem as set forth in claim 11 wherein said valve stem rotating means comprises a transverse plate member mounted on said posts and a rotary actuator mounted on said member, the rotary actuator including a pinion engageable with said stem, a rack engageable with said pinion, and means for driving the rack with respect to the pinion to rotate the stem when the valve disc is engaged against an encrusted valve seat under force of the linear operator independently of linear movement to dislodge or grind accumulated material to permit the valve disc to properly seat to prevent fluid flow through the valve.

13. The improvement as set forth in claim 11 wherein the piston rod is internally bored to receive the end of the stem, the depth of the bore being sufficient to provide a space between the terminus of the stem and the bottom of the bore.

14. A valve stem as set forth in claim 12 wherein said pinion includes an internally threaded bore for engagement with said stem and the external surface of said pinion includes teeth for engagement with a gear rack for driving the pinion with respect to the rack.

15. A valve stem as set forth in claim 12 wherein said pinion includes a smooth bore, the external surface of the pinion includes teeth for engagement with a gear rack for driving the pinion with respect to the rack, and wedges are disposed between the pinion and the stem for engaging the stem and the pinion.

16. A valve stem actuator as set forth in claim 11 wherein the plurality of posts comprises four spaced posts and the rotating means for said valve stem includes a plate member having openings aligned with said posts which permit said member to reciprocate with respect to said posts.

17. In a slurry valve or the like having a valve body, a valve stem and a valve disc, wherein the valve seat of the valve body is subject to encrustation of materials which inhibits proper seating of the valve disc on the valve seat and wherein the valve includes a longitudinally extending valve stem adapted for connection on the end opposite the valve disc, the improvement comprising:

(a) a support frame adapted to extend from said body;
(b) an operator mounted on said support frame including a cylinder having a piston with a piston rod for moving said valve stem linearly with respect to said body;
(c) means for connecting the piston rod to the valve stem;
(d) means mounted and linearly received on said support frame during the linear movement of said valve stem for rotating said valve stem about its axis in either direction with respect to said valve body independently of said linear movement of said valve stem to dislodge accumulated crust to permit the valve disc to properly seat to prevent fluid flow through the valve.

18. In a slurry valve or the like having a valve body, a valve stem and a valve disc, wherein the valve seat of the valve body is subject to encrustation of materials which inhibits proper seating of the valve disc on the valve seat and wherein the valve includes a longitudinally extending valve stem adapted for connection on the end opposite the valve disc, the improvement comprising:

(a) a plurality of posts extending from said valve body;
(b) an operator mounted on said posts including a cylinder having a piston with a piston rod, wherein the end of said piston rod is externally threaded, for moving said valve stem linearly with respect to said body;
(c) means for connecting the piston rod to the valve stem, wherein the connection means comprises a sleeve having a bore, one end of said bore being internally threaded for engagement with the external threads of said piston rod, a bushing in the opposite end of the bore and having internal threads for engagement with said stem, a bearing on said bushing and a cap secured to the sleeve for retaining the bushing and bearing in position to permit linear movement of the valve stem by the operator;
(d) means mounted and linearly received on said posts during the linear movement of said valve stem, for rotating said valve stem about its axis in either direction with respect to said valve body independently of said linear movement of said valve stem to dislodge accumulated crust to permit the valve disc to properly seat to prevent fluid flow through the valve.

* * * * *